United States Patent [19]
Woll

[11] 3,902,682
[45] Sept. 2, 1975

[54] DIVERTER FOR PNEUMATIC TUBE SYSTEMS

[76] Inventor: Toni Woll, 12911 NE. 30th St., Bellevue, Wash. 98009

[22] Filed: Nov. 29, 1973

[21] Appl. No.: 419,952

[52] U.S. Cl. .................................. 243/31; 137/610
[51] Int. Cl.² ......................................... B65G 51/24
[58] Field of Search ........... 243/1, 5, 29, 30, 31, 38; 137/609, 610, 612; 251/298; 302/27, 28; 193/14, 23, 29, 31

[56] References Cited
UNITED STATES PATENTS

| | | | |
|---|---|---|---|
| 431,699 | 7/1890 | Leake | 243/31 X |
| 2,690,931 | 10/1954 | Baresch | 302/28 |

FOREIGN PATENTS OR APPLICATIONS

| | | | |
|---|---|---|---|
| 1,429,289 | 1/1966 | France | 243/31 |

*Primary Examiner*—Evon C. Blunk
*Assistant Examiner*—James L. Rowland

[57] ABSTRACT

A diverter mechanism for pneumatic tube systems is designed for disposition between a main tube and a pair of branch tubes to be placed in communication with the main tube. The mechanism preferably includes an air-tight housing which encloses a pair of diverter tubes, each being pivotally associated with a branch tube and movable between first and second positions where one or the other is operatively aligned with the main tube. Means is included for restricting air-flow in said system to the main tube, a diverter tube aligned therewith and the branch tube with which said diverter tube is associated.

10 Claims, 7 Drawing Figures

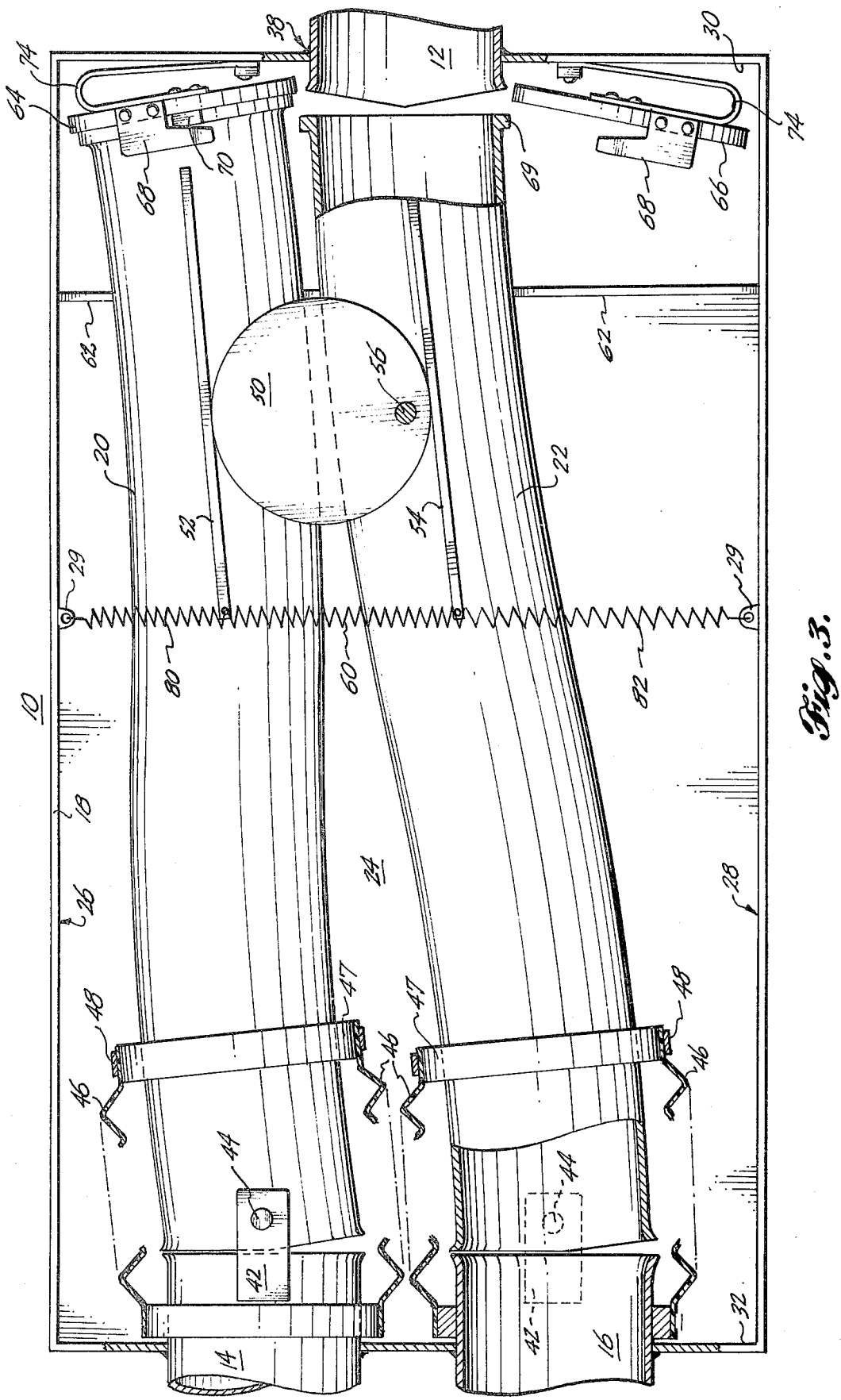

DIVERTER FOR PNEUMATIC TUBE SYSTEMS

BACKGROUND OF THE INVENTION

1. Field of Invention

This invention finds its principal field of application in the art of pneumatic tube systems and, in particular, to the selective diversion of air of vacuum-propelled carriers in such a system between a main tube and either of two branch tubes or vice versa.

2. Description of the Prior Art

Numerous mechanisms have been developed to accomplish carrier diversion in branched or Y-ed pneumatic tube systems. A common practice has been to pivotally associate a single diverter tube with the main tube and provide means to swing such single tube so that its other end aligns with one or another of a pair of branch tubes. Air tightness is a requirement in pneumatic tube systems. For this reason it has been heretofore necessary to carefully design, machine and adjust the movable end of the diverter tube relative the branch tube ends so that a seal is provided and air leakage is precluded or, at least, minimized. Typical such prior constructions are seen in the Kennedy U.S. Pat. Nos. 406,446 and 406,447 of July 1889; the Needham U.S. Pat. No. 1,883,844 and Bauer U.S. Pat. No. 1,883,845 both of October 1932.

There came a time in the development of the art when earlier workers began to enclose and seal off their diverter tubes in air-tight housing. Meyers U.S. Pat. No. 1,713,672 of May 1929 and Bauer (supra) are exemplary of this practice. Note however, that Bauer continued the practice of providing carefully machined sealing surfaces. In order to maintain air-tightness some workers adopted a shiftable valve plate to close off or seal air-flow in respect of an inoperative branch line of a pair when the diverter is operatively related to the other branch line of such a pair. Such apparatus is shown in the Needham (supra) and much more recently in Ekama's U.S. Pat. No. 3,701,496 of October 1972. There is in these days of high costs of manufacture and high costs of maintenance personnel a very real need for a diverter system which can be inexpensively manufactured, can be installed by personnel of not necessarily the highest skill, and requires little or no maintenance attention over long periods of heavy traffic.

Another disadvantage in the prior systems employing a single diverter tube is that the changes of direction are abrupt. As a result as the carrier enters the diverter it slams noisily and violently into an angular wall and, again this happens when the carrier leaves the diverter tube in either direction.

BRIEF DESCRIPTION OF THE DRAWINGS

FIGS. 2 and 3 are plan views showing the diverter apparatus in two positions relative a main tube;

FIG. 4 is a transverse cross-section view on line 4—4 of FIG. 2;

FIG. 5 is a cross-section on line 5—5 of FIG. 2;

FIG. 6 is a perspective view of a valve plate; and

FIG. 7 is a cross-section on line 7—7 of FIG. 2.

DESCRIPTION OF THE PREFERRED EMBODIMENT

Figure 1:
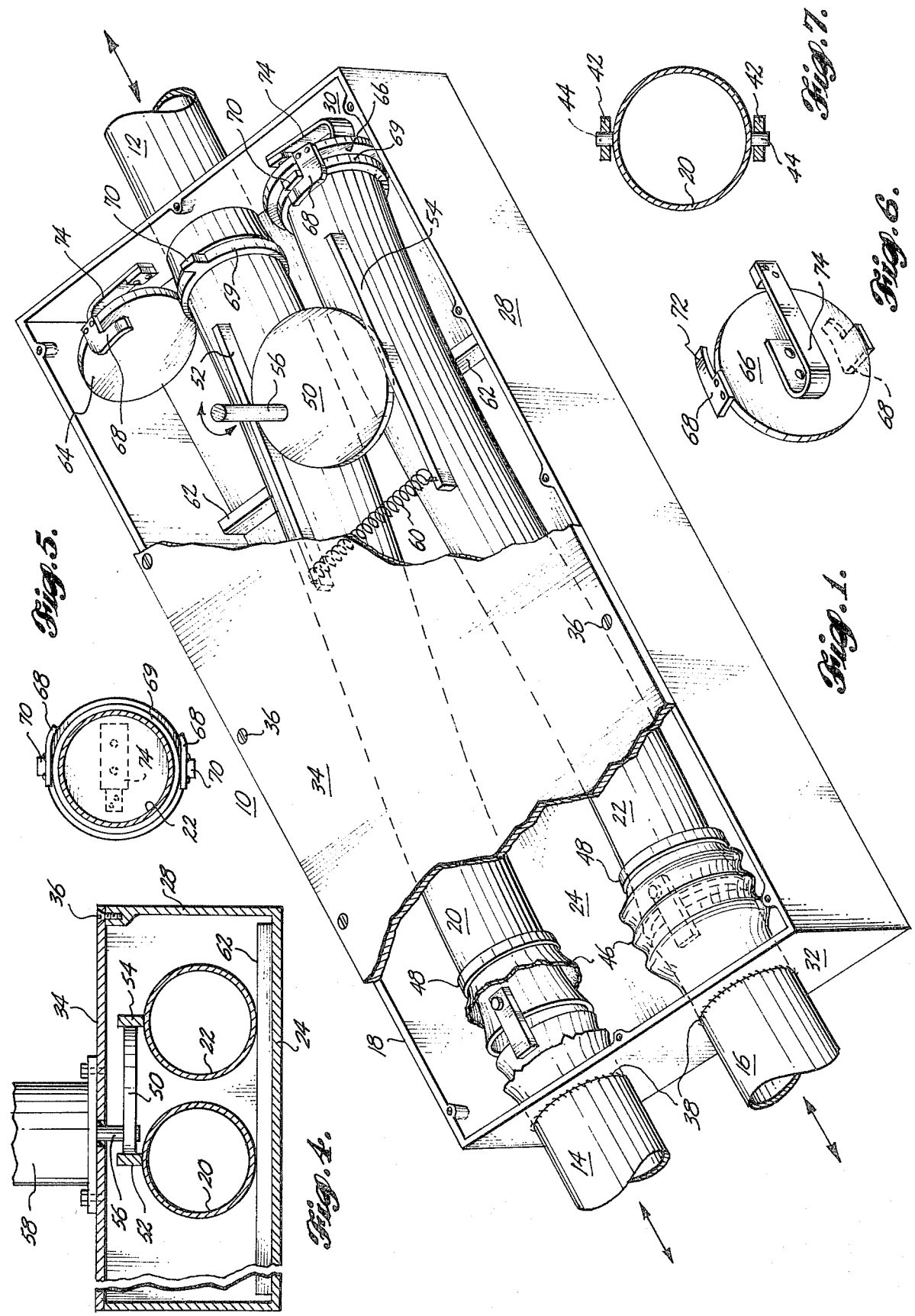
FIG. 1 is a fragmentary perspective view of this diverter apparatus.

In perspective in FIG. 1 is shown somewhat schematically the mechanism of a preferred embodiment of a diverter station 10 for a pneumatic tube system. Details of a typical system are omitted since the nature of such is well understood by those knowledgeable in the art. The subject matter of this invention is incorporated between a main tube 12 and branch tubes 14, 16 within housing 18 which contains the pair of diverter tubes 20, 22. Housing 18 comprises bottom 24, side walls 26, 28, end walls 30, 32 and preferably is closed in an air-tight manner by cover panel 34 secured to the upper edges of the side and end walls by screws 36. Main tube 12 and branch tubes 14, 16 are introduced into the housing 10 by being passed through end walls 30, 32 respectively, preferably sealed thereto by welding beads 38.

The ends of tubes 12, 14 and 16 extend a short distance into the space of housing 10 as shown. Preferably the tube ends are slightly belled or flared to facilitate movement of a carrier 84 (See FIG. 2) through the junctures of the main and tubes 12, 14, 16 with the paired diverter tubes 20, 22.

Diverter tubes 20, 22 are pivotally coupled to branch tubes 14, 16 respectively by means ears 42 secured to the branch tubes and pivot pins 44 outstanding from the diverter tubes. Ordinarily the tubes will be mounted so that the diverter tubes 20, 22 move within housing 10 in a horizontal manner. Spanning the junctions of branch tubes 14 and 16 with diverter tubes 20, 22 are flexible boots 46 secured by annular clamp means 48. Boots 46 in an air tight manner seal said junctions in respect to the interior of housing 10, and encircle spacer rings 47.

The ends of diverter tubes 20, 22 opposite their pivots 42 may be reciprocally moved between first and second positions within housing 10 and relative the housed ends of main tube 12. For example, in FIG. 1 diverter tube 20 is shown in communication with main tube 12 and diverter 22 is out of position for such communication. On the other the relationship changes, as shown in FIG. 3 wherein diverter tube 22 and main tube are aligned. In such case tube 20 is out of communication and therefore disposed inoperably.

Movement of diverter tubes 20, 22 reciprocally between the two described positions is accomplished by actuating means which, in the preferred embodiment includes the eccentric disc 50 and follower members 52, 54 associated with the diverter tubes. The shaft 56 of disc 50 is rotated by motor 58 mounted on cover plate 34. Followers 52, 54 are biased into contact with the edge of disc 50 by spring 60. The diverter tubes 20, 22 may ride on rail 62 transverse the inner bottom 24 of housing 10.

It is desirable to close off the remote end of whichever of the diverter tubes 20, 22 may, in one or the other of said positions, be out of communication with the main tube. To accomplish this a pair of valve plates 64, 66, each resiliently mounted on a U-Spring 74, is provided. Plate 64 is adjacent the path of tube 20 and plate 66 is adjacent the path of tube 22. Each of plates 64 and 66 carries a pair of wedging hooks 68. Each diverter tube end has a flange 69 and carries a pair of wedging horns 70. As a diverter tube is swung out of communication and alignment with main tube 12, its horns 70 enter the mouthes of hooks 68 and is engaged by the sloping or wedging surfaces 72. This action draws one or the other of the valve plates 64, 66 tightly against the relevant diverter tube end and effectively seals the same, precluding air flow communication relative the interior of housing 10.

Figure 2:
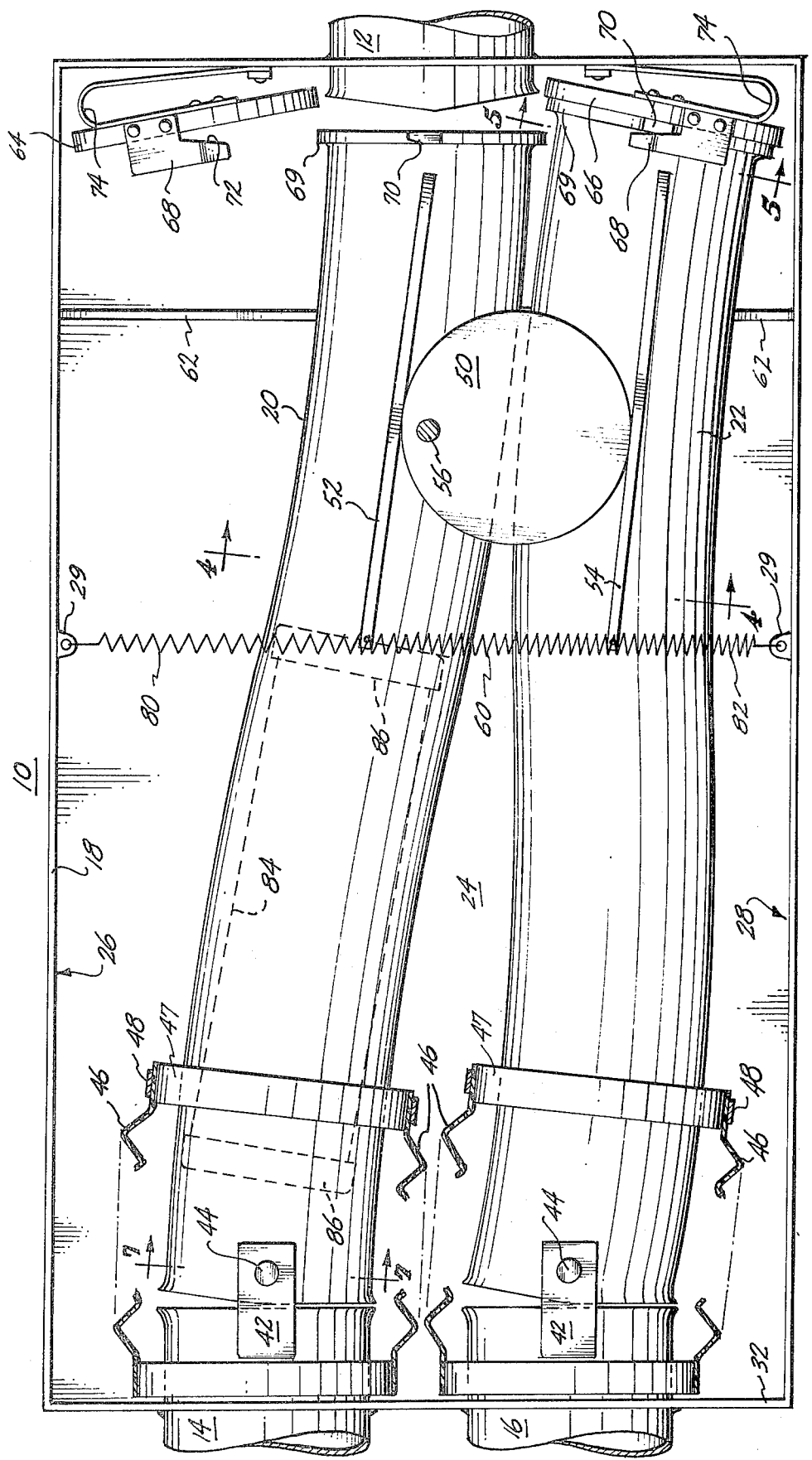

In the foregoing description it has been assumed that the diverter tubes 20, 22 and housing 18 would be mounted in a pneumatic system in which they are moved horizontally or from side-to-side. The apparatus herein is also capable of operation in a situation where the diverter tubes 20, 22 must move in a vertical manner. To accomplish this it is desirable that some of the weight of the diverter tubes be borne otherwise than by eccentric disc 50. In FIG. 2 is illustrated springs 80, 82 connected between the diverter tubes 20, 22 and the respective adjacent walls 26, 28 supporting clips, 29.

A typical carrier 84 having end seal rings 86 is shown in FIG. 2. Such a carrier travelling under the influence of either positive or negative air pressure in the system traverse the slight gap between the main tube 12 and a diverter tube aligned therewith. Smooth passage of such a carrier 84 is also provided by suitably belling the ends of the various tubes as shown throughout the drawings.

An important advantage is gained by this two-diverter tube mechanism as compared with those systems wherein a single switch or diverting tube is employed. In the latter system it has heretofore been necessary to provide carefully machined, fitted and adjusted valve means to close off and preclude air flow to or from a branch tube of a pair when it is not in communication with the main tube. Experience has taught that such prior single diverter tube systems require constant attention and hence involve inordinate maintenance expense. The two-tube system disclosed herein permits the use of the floating valve plates 64, 66 which automatically accommodate themselves to seal the non-used diverter tube end. Little or no attention by maintenance personnel is required to keep the system operating. As a diverter tube swings so that its horn 70 enters hook 68 the tube end and the floating seal plate are smoothly and quickly drawn together and air-flow is precluded.

It will be apparent that the occurrence of mechanical noise makes it impractical to install noisy diverter apparatus in the sites where quiet is very desirable. Also the occurrence of mechanical noise implies mechanical shocks on the equipment and accelerated wear and tear requiring parts replacement as well as higher than desirable maintenance costs. It has been observed that in the prior single tube systems when the carrier leaves the main tube and enters the switch tube at an abrupt angle, it first strikes the side of the switch tube and rattles and bangs therein as it straightens out. This is then repeated as the carrier enters the branch tube again at an abrupt angle. Such causes noise and mechanical shocks to the equipment.

In contrast the use of two diverter tubes as herein provides less abrupt angles in the diversion operation and these can be minimized further by giving the diverter tubes an ogee shape as shown. Observe that the moved end of diverter tube 20 or 22 travels only from the inoperable position to alignment with the main tube 12. In contrast with a single diverter tube pivoted to the main tube its movable end must travel the distance from one to the other branch tube. Thus, in the instant apparatus it is possible to employ the simple eccentric 50 and follower bars 52, 54 to obtain actuation. Hence motor 58 can be of very low power as compared with the heavy duty motors of prior use. Naturally this reduces initial costs and conserves energy during operation.

To maintain air tightness in the system, the simple installation of flexible boots 46 at the pivot joints between each diverter tube 20 or 22 and its respective branch tube 14 or 16 accomplishes sealing there. Valve plates 64 or 66 seal off the non-aligned end of the diverter tubes. Cover plate 34 is desirably installed with sealing gasket means on box 28. And an appropriate seal surrounds motor shaft 56 as it passes through cover plate 34.

In compliance with the statute, the invention has been described in language more or less specific as to structural features. It is to be understood however, that the invention is not limited to the specific features shown or terms used since the means and construction herein disclosed comprises a preferred form of putting the invention into effect. The inventions is, therefore, claimed in any of its forms or modifications within the legitimate and valid scope of the apended claims, appropriately interpreted in accordance with the doctrine of equivalents.

What is claimed is:

1. A diverter mechanism for a pneumatic tube system including a main tube and an opposed pair of branch tubes, comprising:

a pair of diverter tubes generally disposed between said main and branch tubes;

means axially aligning at all times one end of each of said diverter tubes with a respective one of said branch tubes, said means being operable to permit the other ends of said pair of diverter tubes to be linearly reciprocally moved between first and second positions for selective alignment with said main tube wherein, when one of said diverter tubes is interposed between a branch tube and said main tube, the other of said diverter tubes is not interposed between the other branch tube and said main line tube;

actuating means operable to linearly reciprocate said diverter tubes between said two positions; and means restricting air-flow in said system to the main tube, a branch tube and that diverter tube interposed between.

2. The diverter structure according to claim 1 in which said actuating means comprises a member rotatable about a fixed axis and said member is associated with said pair of diverter tubes to simultaneously move both said tubes between said two positions.

3. The diverter structure according to claim 2 in which said rotatable member comprises an eccentric disc and each said diverter tube includes a follower member associated therewith.

4. The diverter structure according to claim 3 in which the follower member of each tube comprises an upstanding rail bearing on an edge of said eccentric disc, and said diverter tubes are biased toward each and against opposed edges of said eccentric disc.

5. The diverter structure according to claim 1 in which said air-flow restricting means comprises a valve member operable to close each diverter tube to air-flow therethrough when the same is not disposed operably relative the main tube.

6. The diverter structure according to claim 5 in which said valve member comprises a resiliently supported plate adapted to receive and bear on the end of such non-interposed diverter tube.

7. The diverter structure according to claim 5 in which said air-flow restricting means comprises an air-tight housing about said diverter tubes and said main and branch tubes enter said housing in an air-tight manner.

8. The diverter structure according to claim 7 in where there is included within said housing a valve member operable to close each diverter to air flow therethrough when the same is not disposed operably relative the main tube.

9. The diverter structure according to claim 8 each said valve member comprises a plate resiliently mounted within said housing contiguous with the path of travel of its respective diverter tube end, and lock means is included to draw such plate tightly to the tube end.

10. The diverter structure according to claim 1 in which each diverter tube is coupled with a branch tube by means of a flexible boot insuring air-tightness.

* * * * *